United States Patent [19]

Tom et al.

[11] Patent Number: 5,707,424
[45] Date of Patent: Jan. 13, 1998

[54] PROCESS SYSTEM WITH INTEGRATED GAS STORAGE AND DELIVERY UNIT

[75] Inventors: Glenn M. Tom, New Milford; James V. McManus, Danbury, both of Conn.

[73] Assignee: Advanced Technology Materials, Inc., Danbury, Conn.

[21] Appl. No.: 742,856

[22] Filed: Nov. 1, 1996

Related U.S. Application Data

[63] Continuation-in-part of Ser. No. 690,633, May 20, 1996, and Ser. No. 650,634, May 20, 1996, each is a continuation-in-part of Ser. No. 322,224, Oct. 13, 1994, Pat. No. 5,518,528.

[51] Int. Cl.⁶ ............................................. B01D 53/047
[52] U.S. Cl. ............... 95/95; 95/127; 95/902; 96/130; 96/143; 96/147; 206/0.7
[58] Field of Search ............................ 95/95, 96, 103, 95/106, 114, 115, 127, 131–133, 148, 902, 97–102, 104, 105; 96/108, 121, 122, 126–128, 130–132, 143, 146, 147; 206/0.7

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 2,356,334 | 8/1944 | Maude et al. | 206/0.7 X |
| 2,663,626 | 12/1953 | Spangler | 206/0.7 X |
| 2,987,139 | 6/1961 | Bush | 95/133 |
| 2,997,371 | 8/1961 | Wadsworth et al. | 95/131 X |
| 3,006,153 | 10/1961 | Cook | 206/0.7 X |
| 3,116,132 | 12/1963 | Haller et al. | 95/133 X |
| 3,144,200 | 8/1964 | Taylor et al. | 96/108 X |
| 3,176,444 | 4/1965 | Kiyonaga | 95/97 X |
| 3,287,432 | 11/1966 | Sensel | 95/95 |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/0.7 X |
| 4,168,149 | 9/1979 | Armond et al. | 95/96 X |
| 4,263,018 | 4/1981 | McCombs et al. | 96/130 X |
| 4,343,770 | 8/1982 | Simons | 206/0.7 X |
| 4,414,005 | 11/1983 | DeBiévre et al. | 95/127 |
| 4,477,265 | 10/1984 | Kumar et al. | 95/96 X |
| 4,552,571 | 11/1985 | Dechene | 95/96 X |
| 4,578,256 | 3/1986 | Nishino et al. | 95/133 X |
| 4,673,415 | 6/1987 | Stanford | 95/96 X |
| 4,744,221 | 5/1988 | Knollmueller | 62/48 |
| 4,749,384 | 6/1988 | Nowobilski et al. | 96/108 X |
| 4,761,395 | 8/1988 | Tom et al. | 502/401 |
| 4,869,733 | 9/1989 | Stanford | 95/96 X |
| 5,051,117 | 9/1991 | Prigge et al. | 95/95 |
| 5,089,244 | 2/1992 | Parent et al. | 95/133 X |
| 5,114,440 | 5/1992 | Reiss | 95/96 |
| 5,133,787 | 7/1992 | Diot et al. | 96/121 |
| 5,151,395 | 9/1992 | Tom | 502/67 |
| 5,224,350 | 7/1993 | Mehra | 95/96 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 63-88017 | 4/1988 | Japan | 96/121 |
| 3-127606 | 5/1991 | Japan | 96/108 |
| 1181692A | 9/1985 | Russian Federation | 95/133 |
| 1544475A1 | 2/1990 | Russian Federation | 95/131 |
| 1583151A1 | 8/1990 | Russian Federation | 95/133 |

*Primary Examiner*—Robert Spitzer
*Attorney, Agent, or Firm*—Steven J. Hultquist; Janet R. Elliott

[57] ABSTRACT

A process system with an integrated gas storage and delivery unit comprising an adsorption-desorption apparatus, for storage and dispensing of a gas wherein the gas is dispensed by pressure differential desorption of the sorbate gas from the sorbent material. A motive fluid driver, e.g., a pump, blower, compressor, eductor, or the like, is arranged for flowing the dispensed gas to a gas-utilizing unit, such as an ion-implant unit, wastewater treatment unit, gas-liquid contacting chamber, chemical vapor deposition reactor, gas laser assembly, etc.

25 Claims, 9 Drawing Sheets

PROCESS SYSTEM WITH INTEGRATED GAS STORAGE AND DELIVERY UNIT

CROSS-REFERENCE TO RELATED APPLICATIONS

This is a continuation-in-part of U.S. patent application Ser. No. 08/650,633 filed May 20, 1996, and is a continuation-in-part of U.S. patent application Ser. No. 08/650,634 filed May 20, 1996, each of which in turn is a continuation-in-part of U.S. patent application Ser. No. 08/322,224 filed Oct. 13, 1994, now issued May 21, 1996 as U.S. Pat. No. 5,518,528.

BACKGROUND OF THE INVENTION

1. Field of the Invention

This invention relates generally to storage and dispensing systems for the selective dispensing of gaseous reagents from a vessel or storage container in which the gas component(s) are held in sorptive relationship to a solid sorbent medium, and are desorptively released from the sorbent medium in the dispensing operation.

2. Description of the Related Art

In the manufacture of semiconductor materials and devices, and in various other industrial processes and applications, there is a need for a reliable source of hydridic and halidic gases. Many of such gases, including for example silane, germane, ammonia, phosphine, arsine, stibine, hydrogen sulfide, hydrogen selenide, hydrogen telluride, and corresponding and other halide (chlorine, bromine, iodine, and fluorine) compounds, as a result of toxicity and safety considerations, must be carefully stored and handled in the industrial process facility.

The gaseous hydrides arsine ($AsH_3$) and phosphine ($PH_3$) are commonly used as sources of arsenic (As) and phosphorus (P) in ion implantation. Due to their extreme toxicity and high vapor pressure, their use, transportation and storage raise significant safety concerns for the semiconductor industry. Ion implantation systems typically use dilute mixtures of $AsH_3$ and $PH_3$ at pressures as high as 1500 psig. A catastrophic release of these high pressure cylinders could pose a serious injury potential and even death to workers in semiconductor fabrication facilities ("fabs").

Based on these considerations, the ion implant user must choose between solid or gas sources for arsenic and phosphorus species. Switching from As to P on an implanter with solid sources can take as long as 90 minutes. The same species change requires only 5-15 minutes with gas sources. However, arsine ($AsH_3$) and phosphine ($PH_3$), the two most commonly used source gases, are highly toxic. Their use has recently been the focus of widespread attention due to the safety aspects of handling and processing these gases. Many ion implantation systems utilize hydride gas sources supplied as dilute mixtures (10-15%), in either 0.44 L or 2.3 L cylinders at pressures of 400-1800 psig. It is the concern over the pressure-driven release of the gases from cylinders that has prompted users to investigate safer alternatives.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Ångstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

It would therefore be a significant advance in the art, and is accordingly an object of the present invention, to provide a gas storage and dispensing system, for the storage and dispensing of gases, which overcomes the above-discussed disadvantages of the method disclosed in the Knollmueller patent.

It is another object of the present invention to provide a system for storage and dispensing of gases which is selectively operable at ambient temperature levels, but is able to effectively utilize the high storage (sorptive) capacity of a wide variety of physical sorbent materials.

Other objects and advantages of the invention will be more fully apparent from the ensuing disclosure and appended claims.

SUMMARY OF THE INVENTION

The present invention relates in one aspect to a process system with an integrated gas storage and delivery unit, comprising an adsorption-desorption apparatus, for storage and dispensing of a gas, such apparatus comprising:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure;

a sorbate gas physically adsorbed on said solid-phase physical sorbent medium;

a dispensing assembly coupled in gas flow communication with the storage and dispensing vessel, comprising a motive fluid driver arranged to effect desorption of sorbate gas from the solid-phase physical sorbent medium, and gas flow of desorbed gas through the dispensing assembly; and a gas-utilization unit coupled in gas flow-receiving relationship to the dispensing assembly, for a utilization of dispensed gas.

In such process systems, the gas utilizing unit of the system may be any of variety of a gas-consuming, gas-treating, or otherwise gas-using process units. Examples include on-demand dispensing of a gas to an ion-implant chamber for ionization therein to produce ion implantation species, sparging of treatment gases into liquid media for solubilization and reaction therein, dispensing of dopant gases for doping of epitaxial films in chemical vapor deposition chambers, dispensing of emergency sterilant gases and decontamination gases into biocontainment facilities, supplying of fluorinated xenon gaseous compounds in excimer laser systems, controlled dispensing of ripening gases into transshipped containers of fruits and vegetables, discharging of fire-suppression and explosion-suppression gases in systems involving processing of flammable reagents, controlled dispensing of hydrogen in combustion engine and fuel cell systems, and the use of gases generally in semiconductor manufacturing operations, including operations such as etching, oxide film formation, doping, epitaxial growth, contact formation, metallization, planarization, etc.

The motive fluid driver in such process systems may comprise any suitable pump, fan, blower, compressor, turbine, venturi, eductor, pressure-building circuit, bellows, diaphragm, peristaltic roller circuit, thermally-coupled gas expansion driver, vacuum extractor, or any other means by which gas is motively withdrawn from the gas storage and dispensing vessel and caused to flow to the gas-utilizing process unit coupled in gas flow communication with the storage and dispensing vessel.

In another aspect, the present invention relates to a process for storage and dispensing of a gas sorbable on a solid-phase physical sorbent medium, such process comprising:

providing a storage and dispensing vessel holding a solid-phase physical sorbent medium;

adsorbing such gas on the solid-phase physical sorbent medium;

establishing, exteriorly of the storage and dispensing vessel, a pressure below the interior pressure, to effect desorption of sorbate gas from the solid-phase physical sorbent medium, and flowing desorbed gas out of the storage and dispensing vessel;

pumping the desorbed gas from the storage and dispensing vessel to a predetermined pressure, wherein such predetermined pressure is higher than the pressure of the desorbed gas flowed out of the storage and dispensing vessel.

When the solid-phase physical sorbent medium in the storage and dispensing vessel is employed to sorptively hold a hydride or halide gas, or other water- or oxide-decomposable gas, the sorbent medium preferably contains less than 500, more preferably less than 100, still more preferably less than 10, and most preferably less than 1, parts-per-million by weight of trace components selected from the group consisting of water and oxidic transition metal species, based on the weight of the physical sorbent medium.

As used herein, the phrase "wherein the solid-phase physical sorbent medium is devoid of trace components selected from the group consisting of water, metals, and oxidic transition metal species in a concentration which is sufficient to decompose the sorbate gas in said storage and dispensing vessel" means that such trace components do not decompose more than 5% by weight of the sorbate gas after 1 year at 25° C. and said interior pressure. Preferably the amount of such decomposition does not exceed 1% by weight on such basis.

In another aspect, the present invention relates to an adsorption-desorption apparatus, for storage and dispensing of a gas, e.g., a gas selected from the group consisting of hydride gases, halide gases, and organometallic Group V compounds, said apparatus comprising:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure;

a sorbate gas physically adsorbed on said solid-phase physical sorbent medium;

a dispensing assembly coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly;

wherein the solid-phase physical sorbent medium concentration of trace components selected from the group consisting of water, metals, and oxidic transition metal species, based on the weight of the physical sorbent medium, is insufficient to cause decomposition of the sorbate gas resulting in more than a 25%, and preferably more than a 10% rise in interior pressure after 1 week at 25° C. in said storage and dispensing vessel.

In such apparatus, the solid-phase physical sorbent medium desirably contains less than 500, preferably less than 100, more preferably less than 10, and most preferably less than 1, part(s)-per-million by weight of trace components selected from the group consisting of water and oxidic transition metal species, based on the weight of the physical sorbent medium.

Still another aspect of the invention relates to an adsorption-desorption apparatus, for storage and dispensing of boron trifluoride, such apparatus comprising:

a storage and dispensing vessel constructed and arranged for holding a solid-phase physical sorbent medium having a sorptive affinity for boron trifluoride, and for selectively flowing boron trifluoride into and out of said vessel;

a solid-phase physical sorbent medium having a sorptive affinity for boron trifluoride, disposed in said storage and dispensing vessel at an interior gas pressure;

boron trifluoride gas, physically adsorbed on said solid-phase physical sorbent medium; and a dispensing assembly coupled in gas flow communication with the storage and dispensing vessel, and constructed and arranged to provide, exteriorly of said storage and dispensing vessel, a pressure below said interior pressure, to effect desorption of boron trifluoride gas from the solid-phase physical sorbent medium, and gas flow of desorbed boron trifluoride gas through the dispensing assembly.

Although generally preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbate gas from the solid-phase physical sorbent medium. Such heating may be employed as an adjunct to the pressure-differential mediated desorption of the sorbed gas from the physical sorbent medium in the storage and dispensing vessel, e.g., in the final stage of the dispensing operation, to secure essentially complete removal of the sorbed gas from the storage and dispensing vessel.

A particularly preferred solid-phase physical sorbent medium comprises a crystalline aluminosilicate composition, e.g., having a pore size in the range of from about 4 to about 13 Ångstroms. Examples of such composition include 5A molecular sieves, and preferably a binderless molecular sieve. Although molecular sieve materials such as crystalline aluminosilicates and carbon molecular sieves are preferred in many instances, the solid-phase physical sorbent medium may usefully comprise other materials such as silica, alumina, macroreticulate polymers, kieselguhr, carbon, etc. Preferred carbon sorbent material comprises bead carbon sorbents.

The on-demand gas dispensing apparatus of the invention may be constructed with a solid-phase physical sorbent medium being present in the storage and dispensing vessel together with a chemisorbent material having a sorptive affinity for contaminants, e.g., decomposition products, of the sorbate gas therein. Such chemisorbent material may for example have a sorptive affinity for non-inert atmospheric gases. Examples of potentially suitable chemisorbent materials include a scavenger for such contaminants, such as a scavenger selected from the group consisting of:

A) scavengers including a support having associated therewith, but not covalently bonded thereto, a compound which in the presence of such contaminant provides an anion which is reactive to effect the removal of such contaminant, said compound being selected from one or more members of the group consisting of:
  (i) carbanion source compounds whose corresponding protonated carbanion compounds have a $pK_a$ value of from about 22 to about 36; and
  (ii) anion source compounds formed by reaction of said carbanion source compounds with the sorbate gas; and (B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

By way of an example, such chemisorbent material may advantageously comprise a scavenger component selected from the group consisting of tritylithium, potassium arsenide, and alkali-metal-treated polystyrene-divinylbenzene copolymer.

In respect of such chemisorbent materials for contaminants of the sorbate gas to be dispensed, any of a wide variety of scavengers or chemisorbent materials may be employed, including scavenger compositions of the types disclosed and claimed in U.S. Pat. No. 4,761,395 issued Aug. 2, 1988 to Glenn M. Tom, et al., and U.S. patent application No. 08/084,414 filed Jun. 29, 1994, now U.S. Pat. No. 5,385,689, in the name of Glenn M. Tom and James V. McManus, the disclosures of which hereby are incorporated herein by reference.

The chemisorbent material when employed may be utilized as a separate bed in gas communication with the bed of physical adsorbent, or alternatively the chemisorbent may be dispersed randomly or selectively throughout a bed of physical adsorbent material in the storage and dispensing vessel.

The invention in another aspect relates to an ion implantation system, comprising a reagent source for reagent source material and an ion implantation apparatus coupled in gas flow communication with such reagent source, and wherein the reagent source is of a type described hereinabove.

The present invention relates in still another aspect to a process for supplying a gas reagent selected from the group consisting of hydride gases, halide gases, and organometallic Group V compounds, such process comprising:
  providing a storage and dispensing vessel containing a solid-phase physical sorbent medium having a physically sorptive affinity for said gas reagent;
  physically sorptively loading on said solid-phase physical sorbent medium a sorbate gas selected from the group consisting of hydride gases and boron halide gases, to yield a sorbate gas-loaded physical sorbent medium; and
  desorbing sorbate gas from the sorbate gas-loaded physical sorbent medium, by reduced pressure desorption, for dispensing thereof;
  wherein the solid-phase physical sorbent medium is devoid of trace components selected from the group consisting of water, metals and oxidic transition metal species in a sufficient concentration to decompose the sorbate gas in said storage and dispensing vessel.

In a further particular aspect, the invention relates to an adsorption-desorption process for storage and dispensing of boron trifluoride, comprising:
  providing a storage and dispensing vessel containing a solid-phase physical sorbent medium having a physically sorptive affinity for boron trifluoride;
  physically sorptively loading boron trifluoride on said solid-phase physical sorbent medium, to yield a boron trifluoride-loaded physical sorbent medium; and
  selectively desorbing boron trifluoride from the boron trifluoride-loaded physical sorbent medium, by reduced pressure desorption, for dispensing thereof.

Another apparatus aspect of the present invention relates to an adsorption-desorption apparatus, for storage and dispensing of a gas sorbable on a solid-phase physical sorbent medium, such apparatus comprising:
  a storage and dispensing vessel constructed and arranged for holding a solid-phase physical sorbent medium, and for selectively flowing gas into and out of said vessel;
  a solid-phase physical sorbent medium disposed in the storage and dispensing vessel at an interior gas pressure;
  a sorbate gas physically adsorbed on the solid-phase physical sorbent medium;
  a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly;
  a cryopump coupled to the dispensing assembly for pressurizing the desorbed gas and discharging the resultingly pressurized gas.

Other aspects, features and embodiments of the invention will be more fully apparent from the ensuing disclosure and appended claims.

DETAILED DESCRIPTION OF THE INVENTION AND PREFERRED EMBODIMENTS THEREOF

Figure 1:
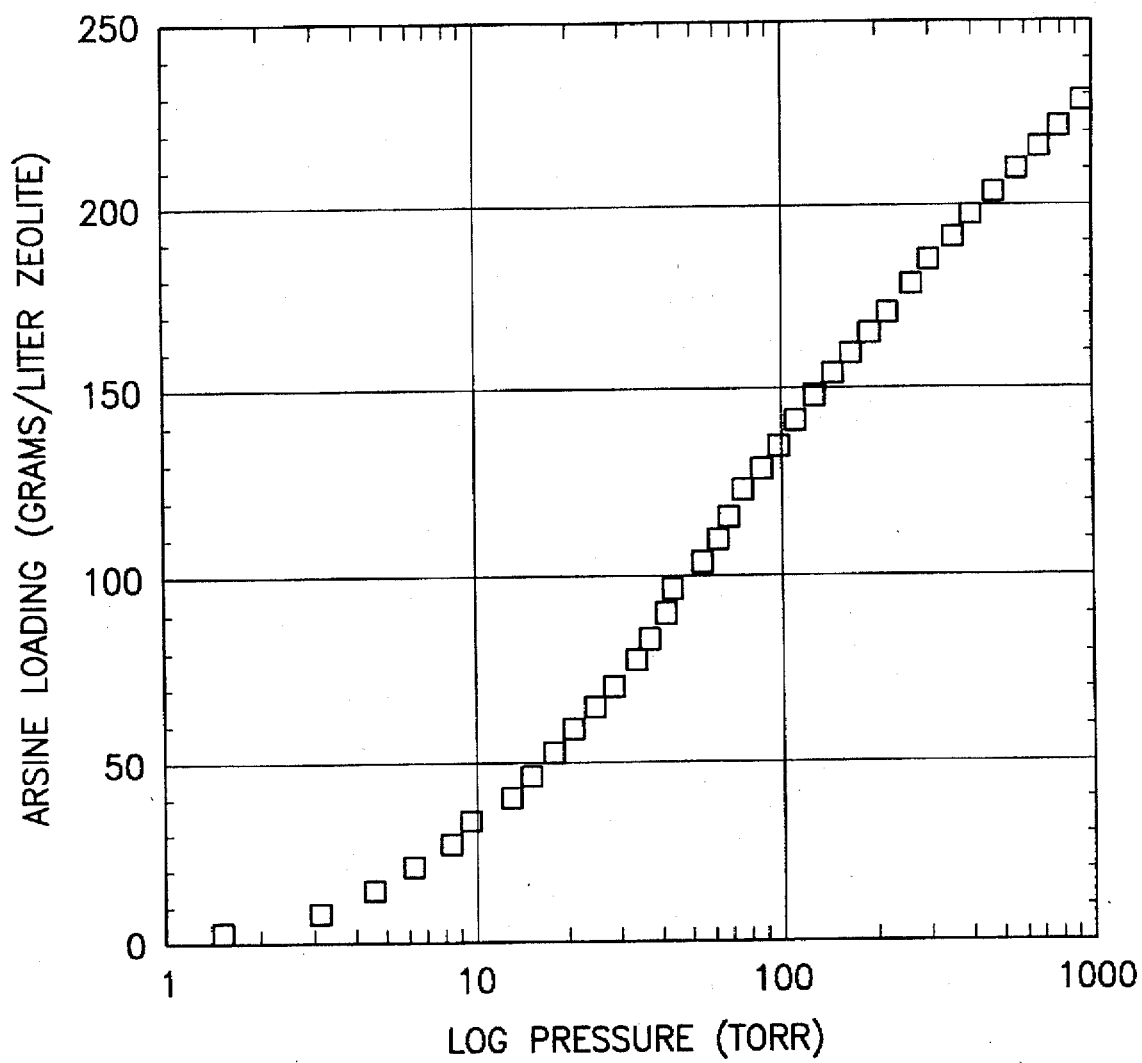
FIG. 1 shows a graph of the adsorption isotherm for arsine, as a plot of the arsine loading in grams arsine per liter of zeolite 5A, as a function of the log pressure in Torr.

The disclosures of the following prior copending United States patent applications are hereby incorporated herein by reference: U.S. patent application Ser. No. 08/650,633 Filed May 20, 1996; U.S. patent application Ser. No. 08/650,634 filed May 20, 1996; and U.S. patent application Ser. No. 08/322,224 filed Oct. 13, 1994 and now issued as U.S. Pat. No. 5,218,528.

The present invention in one aspect provides an atmospheric pressure storage and delivery system apparatus as a source gas supply means for applications such as ion implantation of hydride and halide gases, and organometallic Group V compounds, e.g., arsine, phosphine, chlorine, $NF_3$, and $(CH_3)_3Sb$. The gas source system is comprised of a leak-tight gas vessel, such as a gas cylinder, containing the gas to be dispensed, e.g., arsine or phosphine, adsorbed into a sorbent material comprising zeolite, carbon or other suitable physical adsorbent material. In the case of arsine and phosphine, the zeolite reduces the vapor pressure of the arsine and phosphine to $\leq 1$ atmosphere.

Since the storage and delivery system is initially at atmospheric pressure, the release rate is controlled primarily by diffusion instead of a pressure differential. Inadvertent releases from the storage and delivery system have been measured and result in exposure concentrations to $<\frac{1}{2}$ IDLH. Release rate comparisons of the storage and delivery system to standard cylinders are more fully discussed hereinafter, and demonstrate that the storage and delivery system apparatus and method of the present invention is about $1\times 10^5$ safer than compressed gas sources.

While the invention is discussed primarily hereinafter in terms of the storage and delivery of arsine and phosphine gases, it will be recognized that the utility of the present invention is not thus limited, but rather extends to and is inclusive of various other gases, as for example silane, germane, ammonia, stibine, hydrogen sulfide, hydrogen selenide, hydrogen telluride, and corresponding and other halide (chlorine, bromine, iodine, and fluorine) gaseous compounds such as $NF_3$, and organometallic Group V compounds such as $(CH_3)_3Sb$.

The novel means and method of the present invention for storing and delivering gaseous arsine and phosphine at $\leq 0$ psig greatly reduces the hazard posed by these gases. The technique involves the adsorption of these gases into a physical adsorbent such as, for example, zeolite 5A. By adsorbing the gas into a zeolite, bead carbon, or other suitable solid physical sorbent, the vapor pressure of the gas can be reduced to $\leq 0$ psig. The release potential from this system is greatly reduced as the driving force of pressure is eliminated. Collectively, the storage and delivery system may usefully consist of a standard gas cylinder and cylinder valve, loaded with dehydrated zeolite 5A, activated bead carbon, or any other suitable sorbent material. The cylinder is subsequently filled to 1 atmosphere with the hydride gas.

Although the storage and dispensing vessel in the broad practice of the present invention may be of any suitable size and shape, it is preferred in many applications of the present invention to utilize a vessel which is easily manually handleable and thus portable for transport and deployment purposes in the process facility or application environment in which the storage and dispensing unit is employed.

For such purpose, the vessel may comprise a standard gas cylinder or lecture bottle as the sorbent material container, and the vessel may have an interior volume on the order of for example from about 0.25 liter to about 40 liters, in which a major portion of the interior volume is filled with sorbent medium. Accordingly, the invention contemplates a readily portable and easily transported storage and dispensing vessel for the gas source apparatus of the present invention, although the storage and dispensing vessel in the broad practice of the present invention may be a large-volume tank, e.g., mounted in place as a fixedly positioned installation, or alternatively mounted on a trailer, cart, or other motive structure for transport of the gas storage and dispensing apparatus.

The sorbent medium in the broad practice of the invention may comprise any suitable sorbent material, e.g., any physical sorbent material having suitable sorptive affinity for the gas to be stored and subsequently dispensed from the gas supply system, with appropriate sorption/desorption characteristics for the sorbate gas.

Figure 2:
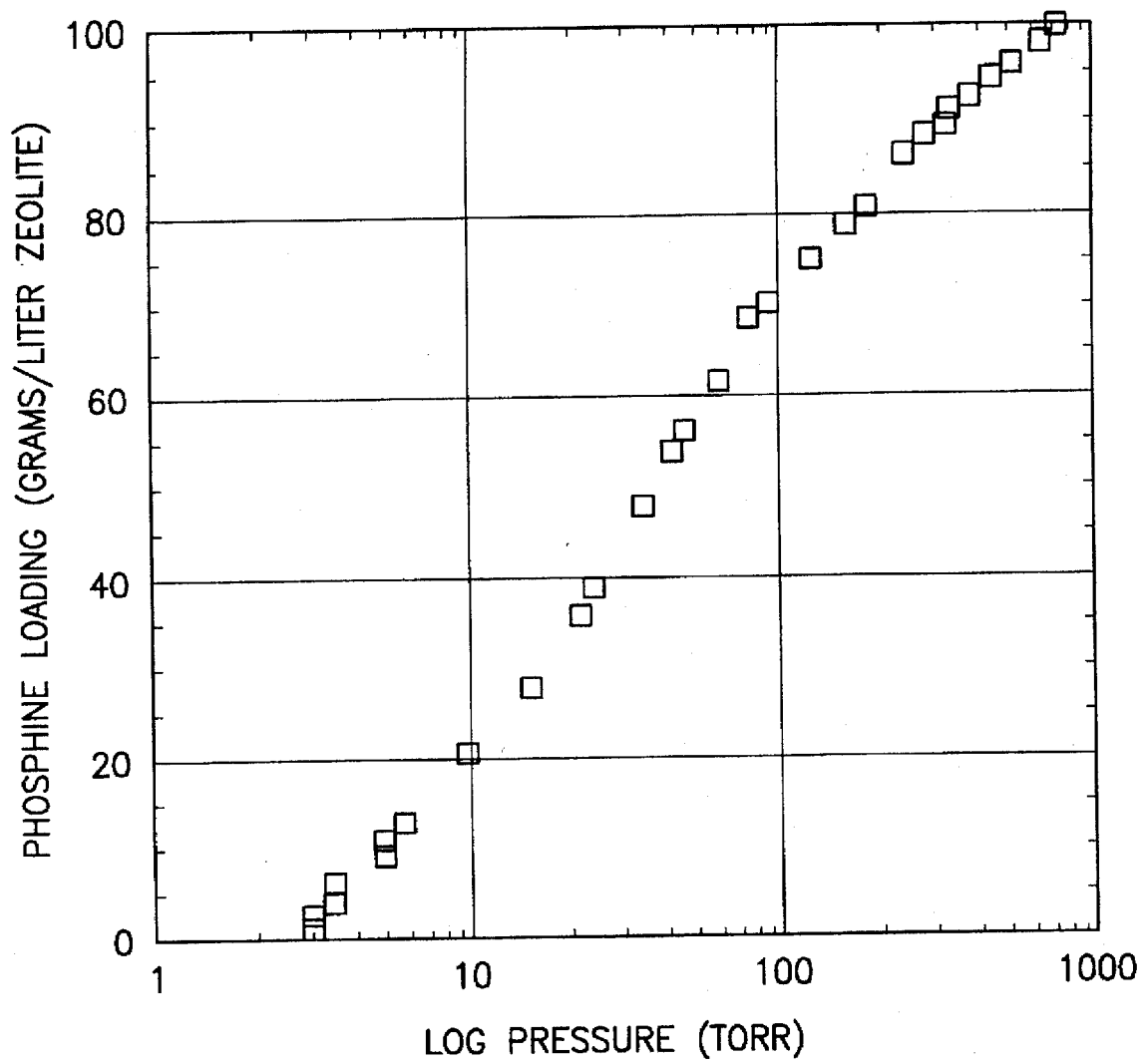
FIG. 2 shows a graph of the adsorption isotherm for arsine, as a plot of the arsine loading in grams phosphine per liter of zeolite 5A, as a function of the log pressure in Torr.

Zeolites are microporous crystalline aluminosilicates of alkali or alkaline earth elements represented by following stoichiometry:

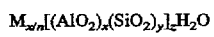

$$M_{x/n}[(AlO_2)_x(SiO_2)_y]_zH_2O$$

where x and y are integers with y/x=to or greater than 1, n is the valence of the cation M and z is the number of water molecules in each unit cell. Zeolite 5A has $\sim 2.5\times 10^{21}$ hydride adsorption sites per gram A liter of zeolite will adsorb 100 grams of phosphine and 220 grams of arsine at 25° C. and 1 atmosphere. FIGS. 1 and 2 show the adsorption isotherms for arsine and phosphine, respectively.

These isotherms show vapor pressure as a function of adsorbed hydride for a 1 liter cylinder. The isotherms are useful in determining the amount of deliverable hydride gas. As seen from the isotherms, roughly 50% of the hydride is adsorbed between 50–760 Torr. This is the amount of hydride that can practically be delivered by the respective storage and delivery systems.

Gas flow from the storage and delivery system is established using the existing pressure differential between the storage and delivery system and the ion implant vacuum chamber or other downstream use locus. Utilizing a device such as a mass flow controller, a constant flow can be achieved as the sorbent container pressure decreases.

Figure 3:
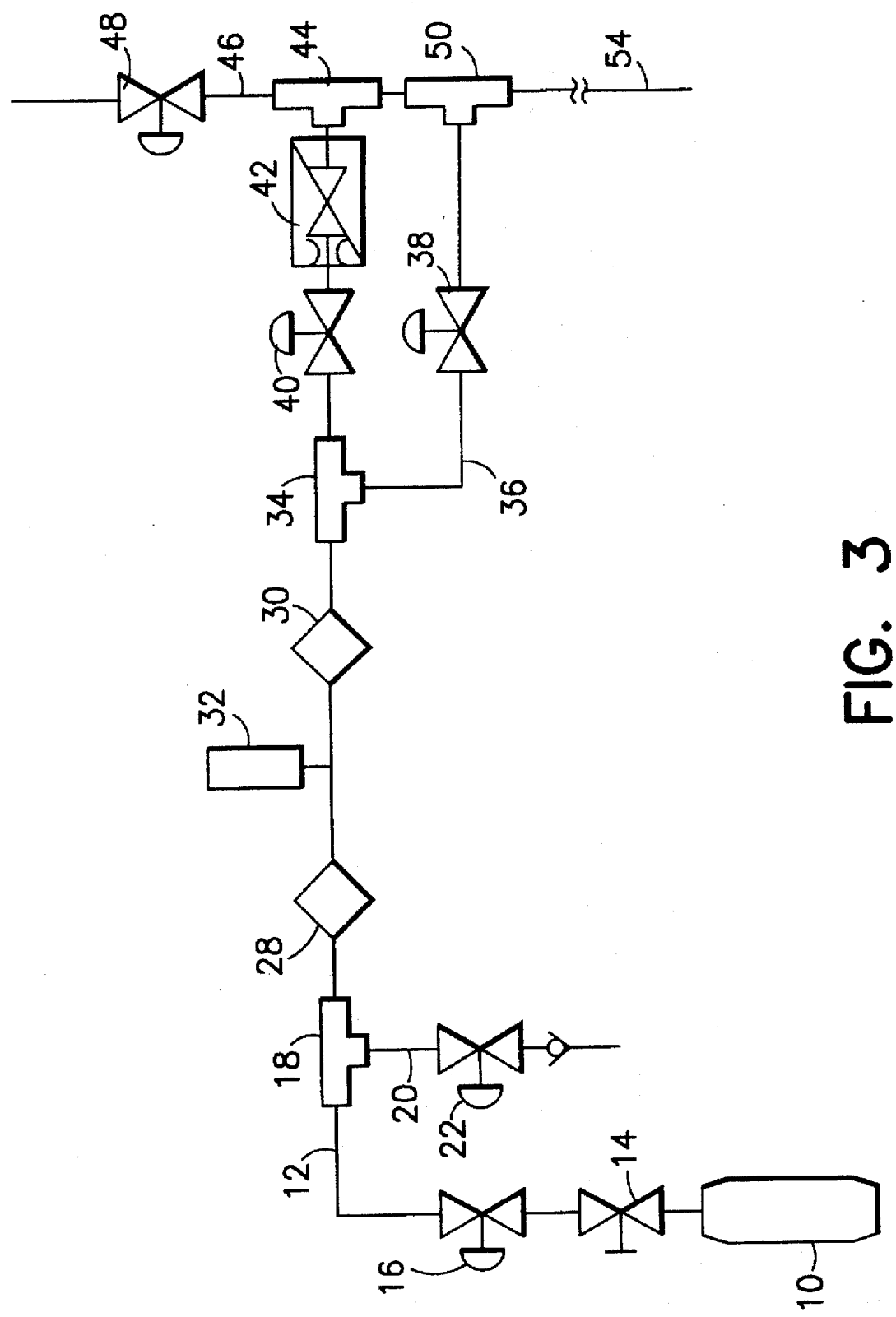
FIG. 3 is a schematic representation of a storage and delivery system according to one embodiment of the invention.

An appropriate delivery system for a zeolite storage system according to the invention is shown in FIG. 3.

In the schematic storage and delivery system shown in FIG. 3, a gas storage cylinder 10 is provided which may be filled with a bed of suitable physical adsorbent material, e.g., a zeolite sorbent or other suitable physical adsorbent medium of a type as more fully described hereinabove. The gas cylinder 10 is provided therein with the physical adsorbent bearing a physically adsorbed gas component, or components, such as arsine or phosphine.

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein. The manifold 12 downstream of fitting 34 has a gas flow on-off valve 40 therein, downstream of which is disposed a mass flow controller 42 for controllably adjusting the flow rate of the hydride or halite gas dispensed through manifold 12. At its terminus downstream of mass flow controller 42, the manifold 12 is connected by coupling fitting 44 to dispensing line 46 having flow control valve 48 therein, and also being coupled in gas flow communication with bypass line 36 via coupling fitting 50. The discharge line 46 is as shown joined to an ion source generating means, schematically shown as element 52. The other end 54 of discharge line 46 may be suitably coupled in gas flow communication with another gas dispensing means, as desirable or necessary in a given end use application of the FIG. 3 storage and delivery system apparatus.

Figure 4:
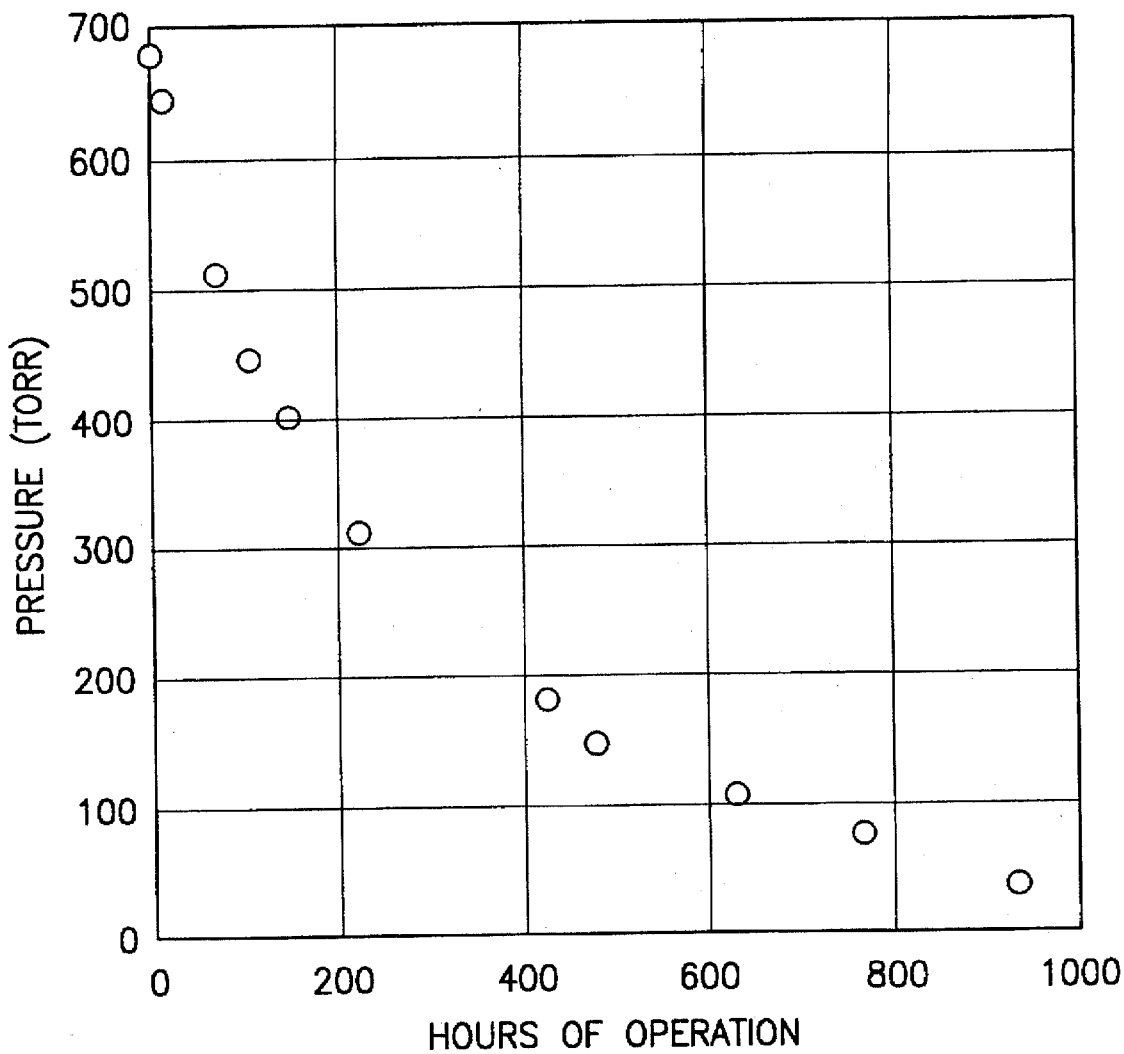
FIG. 4 is a delivery lifetime plot of arsine pressure, in Torr, as a function of hours of operation of the storage and delivery system apparatus.

FIG. 4 shows the delivery lifetime of a 5A molecular sieve (2.35 liters) in an arsine storage and delivery system apparatus to be ~1000 hr. at a flow rate of 1 sccm.

The lifetime test was conducted using a storage and delivery system apparatus similar to that schematically shown in FIG. 3.

In addition to the safety advantages, the zeolite storage technology of the present invention allows for a greater quantity of delivered gas. Table 1 below shows a comparison of delivered hydride from typical high pressure sources to that of the storage and delivery system.

TABLE 1

Comparison of gas delivery from storage and delivery system cylinders vs. standard high pressure cylinder (grams delivered)

| Gas Delivered | 400 psig cylinder delivering 15% gas | 440 ml storage and delivery system | 2.3 liter storage and delivery system |
|---|---|---|---|
| Arsine | 6 | 40 | 225 |
| Phosphine | 3 | 18 | 105 |

Since approximately 5–20 times as much hydride is delivered by the storage and delivery system than by standard cylinders, fewer cylinder changes are required, thereby yielding enhanced productivity of the implant tool. Additionally, since most accidents with gases occur during cylinder changes, safety is further improved.

Since the storage and delivery system operates in the sub-atmospheric regime, the safety aspects related to an accidental incursion of air into a phosphine storage and delivery system cylinder were investigated. Phosphine spontaneously reacts with air as shown in the following equation:

$$4PH_3 + 8O_2 \rightarrow P_4O_{10} + 6H_2O$$

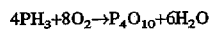

$$\Delta H_f \text{ of } P_4O_{10} = -720 \text{ Kcal/mole}$$

Figure 5:
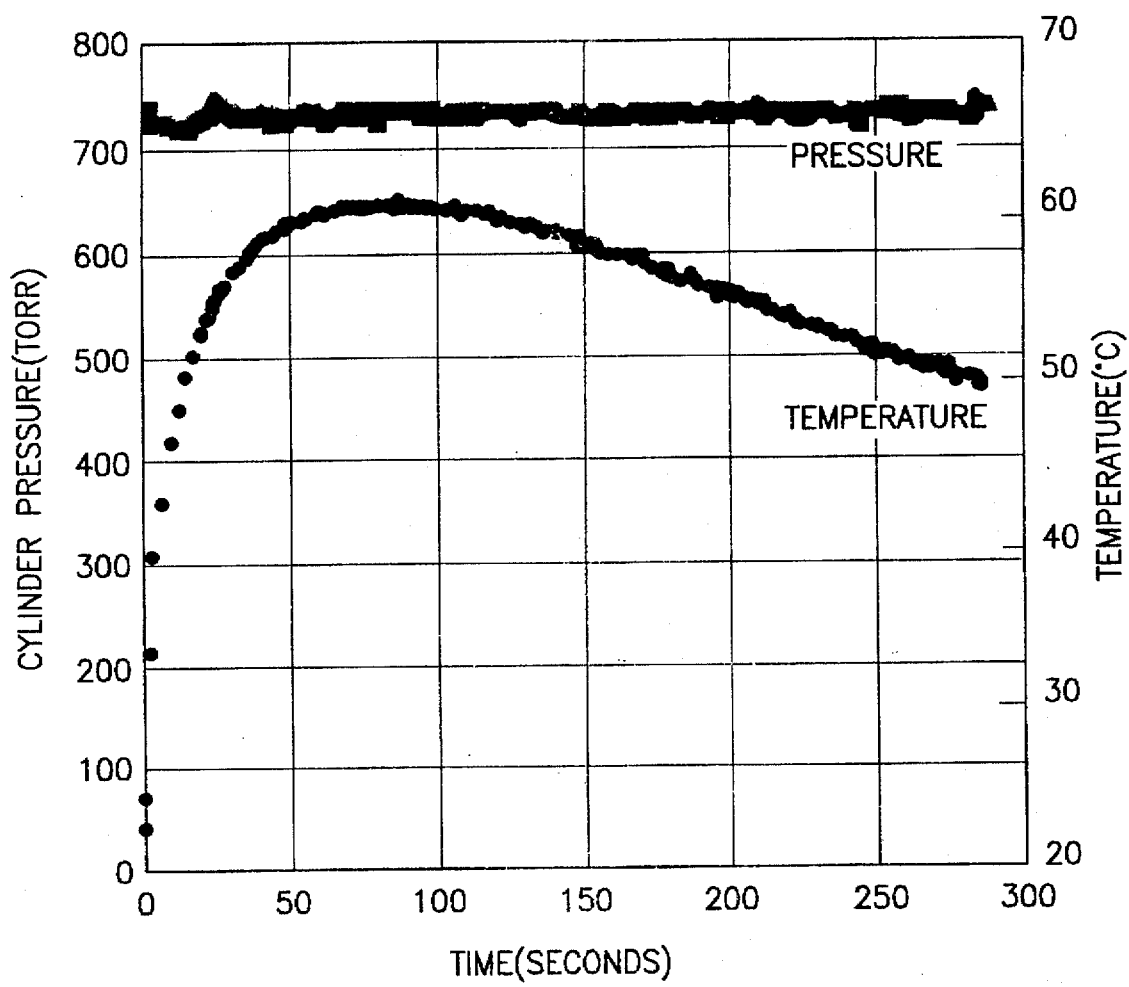
FIG. 5 is a plot of cylinder pressure, in Torr, as a function of time, in seconds, as well as a plot (on the right-hand y-axis) of temperature, in degrees Centigrade, as a function of time, in seconds, graphically showing the temperature and pressure rises during the experimental backfilling of a phosphine gas storage and delivery system apparatus, with room air.

A threshhold concern and intuitive expectation is that the high heat of reaction would cause a large pressure excursion or even a detonation in the cylinder. However, it has been determined that the event of ingressing air is of a manageable character, since most of the resultingly generated heat will be adsorbed by the zeolite substrate. FIG. 5 shows the temperature and pressure rise during the experimental backfilling of a 0.5 liter phosphine storage and delivery system with room air, as a plot of cylinder pressure, in Torr, as a function of time, in seconds.

In the FIG. 5 system, the initial temperayure of the phosphine storage and delivery system was 22° C. Upon backfilling, the reaction temperature was monitored with a thermocouple located inside the storage and delivery system cylinder. The reaction with air caused a temperature rise of 35° C. inside the cylinder. The cylinder pressure was measured using a capacitance temperature transducer. The maximum pressure recorded was ~800 Torr. The pressure rise above 1 atmosphere is a result of the increased bed temperature. The experimental data led us to conclude that the air backfill of a partially used phosphine storage and delivery system is not a significant safety hazard. The arsine case was not investigated as arsine reacts slowly with air at room temperature.

Figure 6:
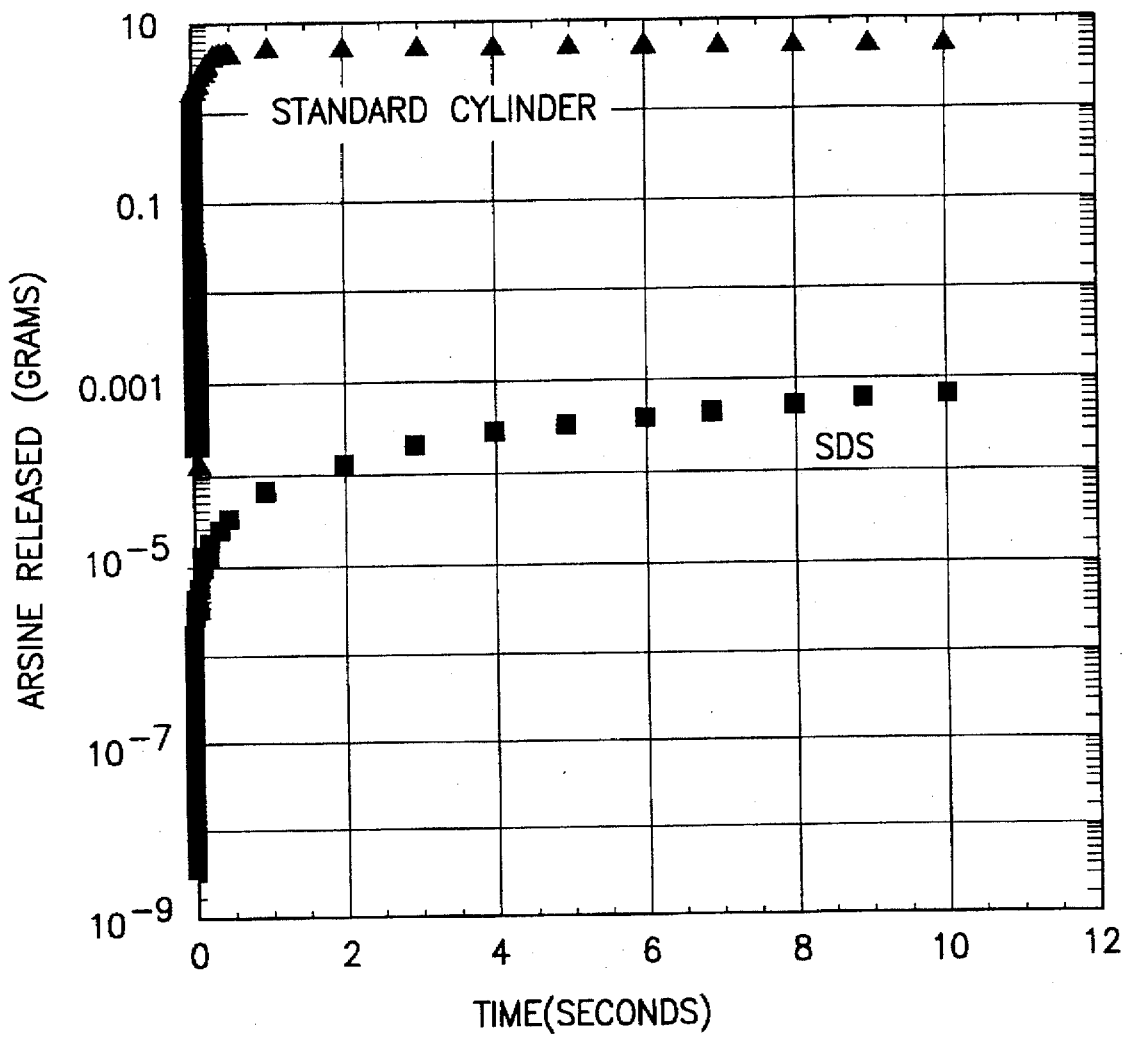
FIG. 6 is a plot of arsine released, in grams, as a function of time, in seconds, for a standard cylinder of arsine, versus an arsine storage and delivery system apparatus, in simulation of a worst case emission incident.

Hydride release was measured in a storage and delivery system apparatus of the type shown in FIG. 3 and described hereinabove. The emission rate of arsine from the storage and delivery system was measured and found to be 3.8 milligrams/minute. Although small, such rate was 3 orders of magnitude larger than that calculated from diffusion equations. It is suspected that the apparatus used in this experiment gave an erroneously high emission rate due to an eduction effect. Nonetheless, this experiment gives a worst case emission rate that is still $10^{-5}$ times less than a standard high pressure cylinder. FIG. 6 shows the emission rate of a standard gas cylinder versus an arsine storage and delivery system.

The purity of the arsine and phosphine from the storage and delivery system of the instant invention is exceptionally high. The only significant impurity detected was $H_2$. The hydrogen levels were found to vary between 10–1000 ppm.

Since $H_2$ is currently used as a diluent in high pressure cylinders, its presence is non-problematic in terms of operational efficacy of the storage and delivery system apparatus and method. Gas chromatography and mass spectroscopy have been used to verify the purity of the hydride.

The storage and delivery system-delivered arsine and phosphine are fully compatible with the ion implantation process. Yield analyses of wafers from split lots have been shown to be identical for those implanted with As and P from the storage and delivery system compared with those implanted with As and P from standard sources.

The storage and delivery system apparatus and method of the invention thus provide a significantly safer alternative to the current use of high pressure gas cylinders for the storage and dispensing of hydride and halide gases. The invention provides the capability to transport, store and deliver hydrides from a cylinder or other vessel at zero psig. The invention is based on the discovery that a wide variety of sorbable gases, e.g., hydride and halide gases, etc., can be physically adsorbed into the microcavities of suitable support materials such as zeolites, thereby significantly reducing the pressure of gas for storage and dispensing purposes.

With only low level heating of the sorbent material in the practice of the present invention, by so-called thermally assisted delivery, it is possible to augment the delivery rate of the desorbing gas, so that flow rates of up to 500 sccm and higher are readily achieveable. Nonetheless, high rates of gas delivery are achieved in the broad practice of the present invention with adiabatic operation (no supplemental input of heat or thermal energy to the sorbate-laden sorbent medium), solely by the pressure differential existing between the sorbent vessel and the reduced pressure of the semiconductor (or other industrial or manufacturing) process, such as ion implantation, molecular beam epitaxy, and chemical vapor deposition.

The apparatus of the present invention may be readily provided in a unitary apparatus form, as disposed in a gas cabinet containing a multiplicity, e.g., three, sorbent vessels, each manifolded together for selective delivery of sorbate gas from one or more of such vessels. The cabinet may further include therein independent thermocouples, or other temperature sensing/monitoring equipment and components for preventing overheating of the vessels and/or other internal components of the gas cabinet in use thereof.

The cabinet may additionally include a fusible link heater element for selective augmentive heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

In the preferred practice of the invention, the solid-phase physical sorbent medium is devoid of trace components selected from the group consisting of water, metals, and oxidic transition metal species in a concentration which is insufficient to decompose the sorbate gas in said storage and dispensing vessel. A highly advantageous sorbent medium of such type is commercially available from Zeochem Company (Louisville, Ky.) as Zeochem Binderless 5A sorbent, which is a synthetic calcium aluminosilicate of the formula $(CaO.Na_2O).Al_2O_3.2SiO_2.xH_2O$.

In this respect, it is to be noted that the significant presence in the sorbent material of any water, metals, or transition metal oxides tends to promote undesirably high levels of decomposition of the sorbate gas. In molecular sieves and other materials which lack such "contaminants" the sorbate gas degradation levels, and corresponding pressure levels are maintained at correspondingly low values. Concerning molecular sieve materials most specifically, a large number of such sorbents invariably contain clay or other mineralic binders which may contain the aforementioned decomposition promotors, which undesirably degrade the performance of the storage and delivery system apparatus and method.

By way of example, the above-mentioned binderless Zeochem material has no detectable metallic impurities, while other conventional molecular sieve materials, e.g., Linde 5A zeolite, has a substantial amount of iron therein. In consequence, experiments showed that the arsine stored in the binderless zeolite exhibited decomposition levels which were on the order of about 1–2% of arsine (in an arsine storage and delivery system apparatus containing such zeolite) per year, while arsine stored in the Linde 5A zeolite exhibited decomposition levels of arsine which were on the order of a few tenths of a percent of the arsine per day. With the binderless zeolite, pressure increases in the sorbent material-containing vessel were less than 5% per week, while the Linde 5A zeolite (containing binder metal components) exhibited pressure rises of 9 psig (60%) per day in a corresponding storage and delivery system apparatus.

The solid-phase physical sorbent medium in the preferred practice of the invention therefore contains less than 500 parts-per-million by weight of trace components selected from the group consisting of water and oxidic transition metal species, based on the weight of the physical sorbent medium, more preferably less than 100 parts-per-million by weight, still more preferably less than 10 parts-per-million, and most preferably no more than 1 part-per-million by weight of trace components selected from the group consisting of water and oxidic transition metal species, based on the weight of the physical sorbent medium.

Correspondingly, the solid-phase physical sorbent medium concentration of trace components selected from the group consisting of water and oxidic transition metal species (e.g., oxides, sulfites and nitrates), based on the weight of the physical sorbent medium, preferably is insufficient to decompose more than 5% by weight of the sorbate gas after 1 year at 25° C. and said interior pressure.

In some applications, it is desired to provide gases deriving from a storage and delivery system apparatus at a higher-than-discharge pressure from the storage and delivery system sorbent-containing vessel. In such instances, venturi pumps may be employed which raise the pressure of the supplied gas to a selected pressure level above that at the cylinder head (of the cylinder containing the sorbent binding the gas being dispensed). Although such venturi pumping arrangements yield the dispensed gas at the selected higher pressure level, such arrangements nonetheless entail dilution of the gas being dispensed with a carrier gas, since the carrier gas is entrained with the dispensed gas from the cylinder.

Such dilution effect represents a significant constraint on the overall process system, in instances where neat gas of high purity is desired from the storage and delivery system apparatus. Mechanical pumps may be used in place of venturi pumping means, but various types of mechanical pumps entail the disadvantage of a significant number of moving parts, which can cause problems associated with the formation of particulates in the pump and/or entrainment of lubricants. Nonetheless, where such particulate formation and/or lubricant entrainment characteristics are not problematic (e.g., not excessive or within tolerable operating limits), various types of such mechanical pumps may be advantageously employed. Further, other types of pumps are not susceptible to such operating problems, e.g., peristaltic or bladder-type displacement pumps, and may be generally usefully employed, as well as other motive fluid driver means, to effect the passage of the desired flow rate and cumulative volume of the dispensed gas to the gas-utilizing process unit.

In some instances, where the gas supplied by the storage and delivery system apparatus is desired to be furnished at high pressure in a high purity, neat condition, the provision of a cryopumping assembly in the storage and delivery system apparatus may be advantageous.

Figure 7:
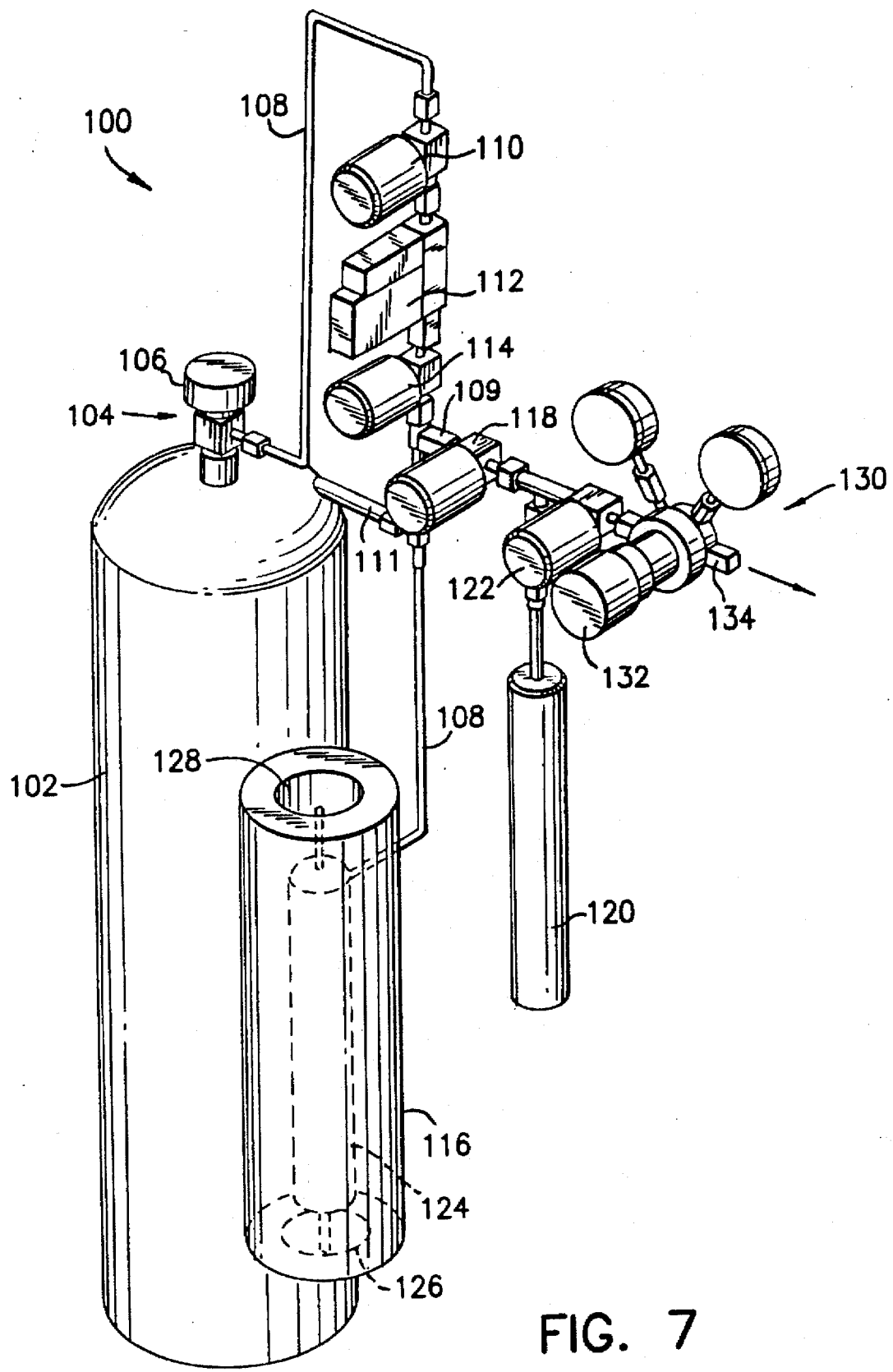
FIG. 7 is a schematic perspective view of a cryopumping storage and delivery system apparatus according to a further embodiment of the invention.

FIG. 7 is a schematic perspective view of such a cryopumping storage and delivery system apparatus 100, according to a further embodiment of the invention.

In the cryopumping system, the main cylinder 102 contains a suitable sorbent material (not shown), e.g., molecular sieve, having loaded thereon a suitable sorbate gas species to be subsequently dispensed, and is equipped with a valve head assembly 104 including main cylinder valve 106, which is in the "off" position at the start of the dispensing process.

The valve head 104 is coupled to conduit 108 containing isolation valve 110, mass flow controller 112, isolation valve 114, and cryopump 116. Conduit 108 is in turn coupled to conduit 109 containing isolation valves 118 and 122 and product dispensing regulator assembly 130 having discharge port 134 coupleable to a downstream process system. Joined to the conduit 109 is a medium pressure storage vessel 120.

The cryopump 116 coupled to conduit 108 is provided with a liquid nitrogen (or other suitable cryogenic liquid or fluid) inlet 128 and a liquid nitrogen outlet 126, with a liquid cryogen flow path being provided intermediate the inlet 128 and the outlet 126 which is circumscribed by heating elements 124 as shown. The liquid cryogen inlet and outlet of the cryopump may be suitably joined to a source of liquid cryogen, as for example a cryogenic air separation installation or a cryogenic cylinder source of liquid nitrogen or other coolant. The cryopump thereby forms a cryotrap apparatus. The outlet of the cryopump thus is provided with an isolation valve 122, and the medium pressure cylinder 120 is isolatable by means of the isolation valve 122.

A pressure transducer 111 is provided in conduit 108 and is coupled in pressure monitoring relationship to cylinder 102 for monitoring of pressure in the cylinder and responsively adjusting the isolation valve 118.

The operation of the storage and delivery system shown schematically in FIG. 7 is illustrated below with reference to silane as the gas sorbed on the sorbent in cylinder 102 and to be delivered at suitable elevated pressure, and nitrogen as the cryogen to be employed as the working fluid in the cryopump 116. Silane has a boiling point of −111.5° C. and a melting point of 185° C., and nitrogen has a boiling point of −195.8° C.

Silane has been selected for illustration purposes since it is relatively difficult to deliver at suitably elevated pressure (in relation to other hydridic gases such as arsine which have higher boiling and freezing points, and thus may be more easily cryopumped with less cryogenic cooling being required).

If at the outset valves 110, 114, and 106 are open, with valves 118 and 122 being closed and under vacuum, and the temperature in the cryogenic pump is lowered to liquid nitrogen temperatures, silane will condense and freeze in the cryopump, even if relatively low internal pressures exist in the supply cylinder 102.

The mass flow controller 112 allows for accurate determination of the quantity of gas being transferred to the cryopump 116. Such accurate determination is important because overpressurization of the cryopump is desirably avoided. Under such operating conditions, silane will be above its critical temperature so that the ultimate pressure in the cryopump can potentially become very high.

After the correct amount of gas has been transferred to the cryopump 116, the valves 110 and 114 are closed. The condensed silane then is warmed to near ambient temperatures The heating is carried out by the heating means 124, which in the embodiment shown comprise band heaters but could be any suitable heating means appropriate for such service. The silane gas does not thereby have to be heated to high temperatures, and the stability and purity of the product gas to be dispensed is thereby enhanced, since heating may result in the occurrence of degradation of the silane gas with consequent adverse effect on its purity and further stability.

The pressure of the silane gas after the warm-up in the cryopump may become significantly elevated, and effectively the gas thereby has become compressed, in a high purity state, and without exposure to a mechanical pump with many moving parts which may otherwise result in contamination of the product gas.

The inventory of gases in the overall system may be quite low at this point, with most of the silane residing in the sorbent vessel, cylinder 102, at low pressure.

Opening valve 118 will then allow gas to flow into the medium pressure cylinder 120; if valve 122 is open, then product silane gas can flow to the downstream process through discharge port 134, as monitored by the monitoring means (e.g., flow pressure) associated with the regulator assembly 130. The regulator assembly 130 has associated pressure transducer 132 which may be operatively coupled in the overall system with the other valves and cryopump components so that the product gas is delivered at a selected pressure and volumetric flow rate.

Correspondingly, the various valves, mass flow controller, cryopump, transducers and regulator may be operatively interconnected in any suitable manner, e.g., with cycle timer, and process safety systems, to carry out the demand-based delivery of silane or other sorbate gases, in a readily controllable and reproducible manner.

Accordingly, the operation of the system schematically shown in FIG. 7 desirably is timed to avoid disruption to or interference with downstream process flows. Signals from the mass flow controller and pressure transducers in the cryopump and medium pressure tanks can be used in an automated process system. The cryopump can be cycled to move gases from the storage and delivery system to the medium pressure cylinder 120 to maintain a constant pressure at the outlet of the regulator.

EXAMPLE 1

Decomposition of arsine gas in a storage and delivery cylinder was comparatively evaluated for each of two molecular sieve sorbent materials: Linde 5A molecular sieve (Union Carbide Corporation, Danbury, Conn.), hereinafter referred to as Sorbent A, and Zeochem 5A molecular sieve (Zeochem, Louisville, Ky.), hereinafter referred to as Sorbent B. Each of Sorbent A and Sorbent B are synthetic crystalline calcium aluminosilicates having 5 Ångstrom pore size, but Sorbent A contains a clay binder whereas Sorbent B is binderless.

Set out in Table II below is a quantitative analysis of the Sorbent A and Sorbent B showing the differences in composition thereof, where the part-per-million (ppm) concentrations listed are ±50%.

TABLE II

Quantitative Analysis of Sorbent A and Sorbent B in parts-per-million (ppm)

|  | Sorbent A | Sorbent B |
| --- | --- | --- |
| Aluminum | major* | major |
| Barium | <372 | <301 |
| Beryllium | <372 | <301 |
| Calcium | major | major |
| Cobalt | <372 | <301 |
| Chromium | <372 | <301 |
| Copper | <372 | <301 |
| Iron | 3084 | <301 |
| Gallium | <372 | <301 |
| Magnesium | 556 | <301 |
| Manganese | <372 | <301 |
| Molybdenum | <372 | <301 |
| Nickel | <372 | <301 |
| Phosphorus | <372 | <301 |
| Lead | <372 | <301 |
| Silicon | major | major |
| Tin | <372 | <301 |
| Strontium | <372 | <301 |
| Titanium | <372 | <301 |
| Vanadium | <372 | <301 |
| Zinc | <372 | <301 |
| Zirconium | <372 | <301 |
| % Silicon | 21.19 | 19.70 |
| % Aluminum | 19.11 | 17.39 |
| % Calcium | 7.21 | 7.45 |

*"major" here referring to at least 5% by weight, based on the total weight of the molecular sieve As shown by the data in Table II, Sorbent B contained trace amounts (defined here as amounts of less than about 500 ppm of the specified component) of all measured elements with the exception of the major components of the molecular sieve, calcium, aluminum, and silicon, while Sorbent A contained a significant amount of iron (3084 ppm) and slightly more than a trace amount of magnesium.

In the comparison test of the two sorbent materials, each of identical gas cylinders was filled with a respective sieve material (Sorbent A in a first cylinder and Sorbent B in a second cylinder), and the sieve materials in each of the cylinders was loaded with a same amount of arsine gas. After the loading of the sieve materials in the respective cylinders, the pressures in each of the cylinders was monitored for pressure rise due to decomposition of arsine by the reaction As→As+1.5 $H_2$, since hydrogen is not adsorbed by the molecular sieves used. Such monitoring took place at constant temperature.

Figure 8:
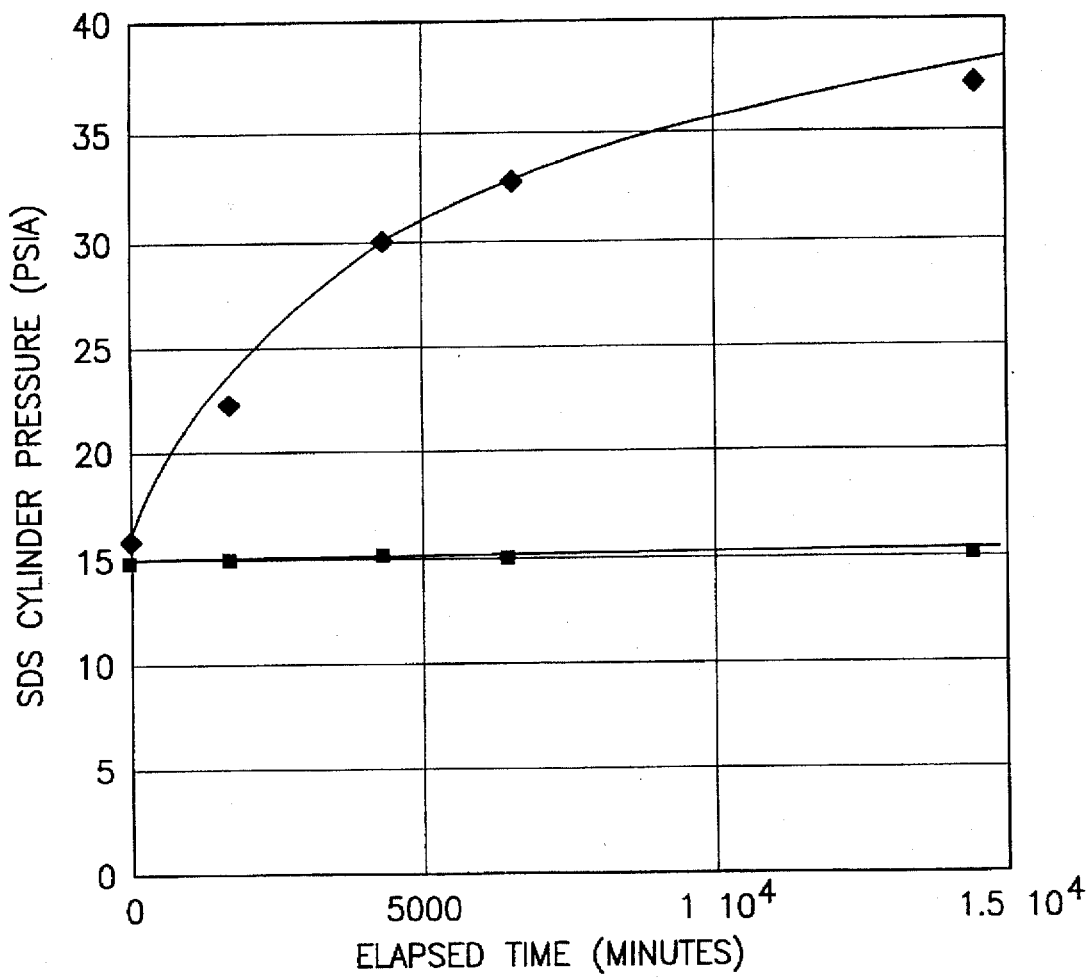
FIG. 8 is a graph of storage and delivery system cylinder pressure level, in psia, as a function of elapsed time, in minutes, for two molecular sieve sorbent materials of differing iron content.

The resulting pressure history as a function of time is shown in the graph of FIG. 8, in which the pressure in psia is plotted as a function of elapsed time, in minutes. As shown by the Figure, curve A, showing the pressure behavior of the gas in the cylinder containing Sorbent A, after 250 hours rose to approximately 37.5 psia, while curve B, showing the pressure behavior of the gas in the cylinder containing Sorbent B, shows no pressure rise over the same period of time of the test.

The performance differences exhibited by the respective Sorbents A and B is striking, for the fact that while otherwise compositionally equivalent, the fact of the more-than-trace concentration of iron in Sorbent A led to substantially increased pressure due to the decomposition of arsine in the cylinder containing Sorbent A, while Sorbent B maintained the arsine in an undecomposed state, with no formation of hydrogen being observed in respect of pressure increase.

Accordingly, it is a significant discovery that the decomposition of hydridic gases such as arsine, phosphine, etc., can be suppressed by the provision of sorbent materials which are devoid of more than trace amounts of contaminants such as iron, which are conventionally present in commercially available molecular sieves and other sorbent materials comprising mineralic or clay-based binders, which have been incorporated in the sorbent composition for enhancing the structural stability and integrity of the sorbent material.

Figure 9:
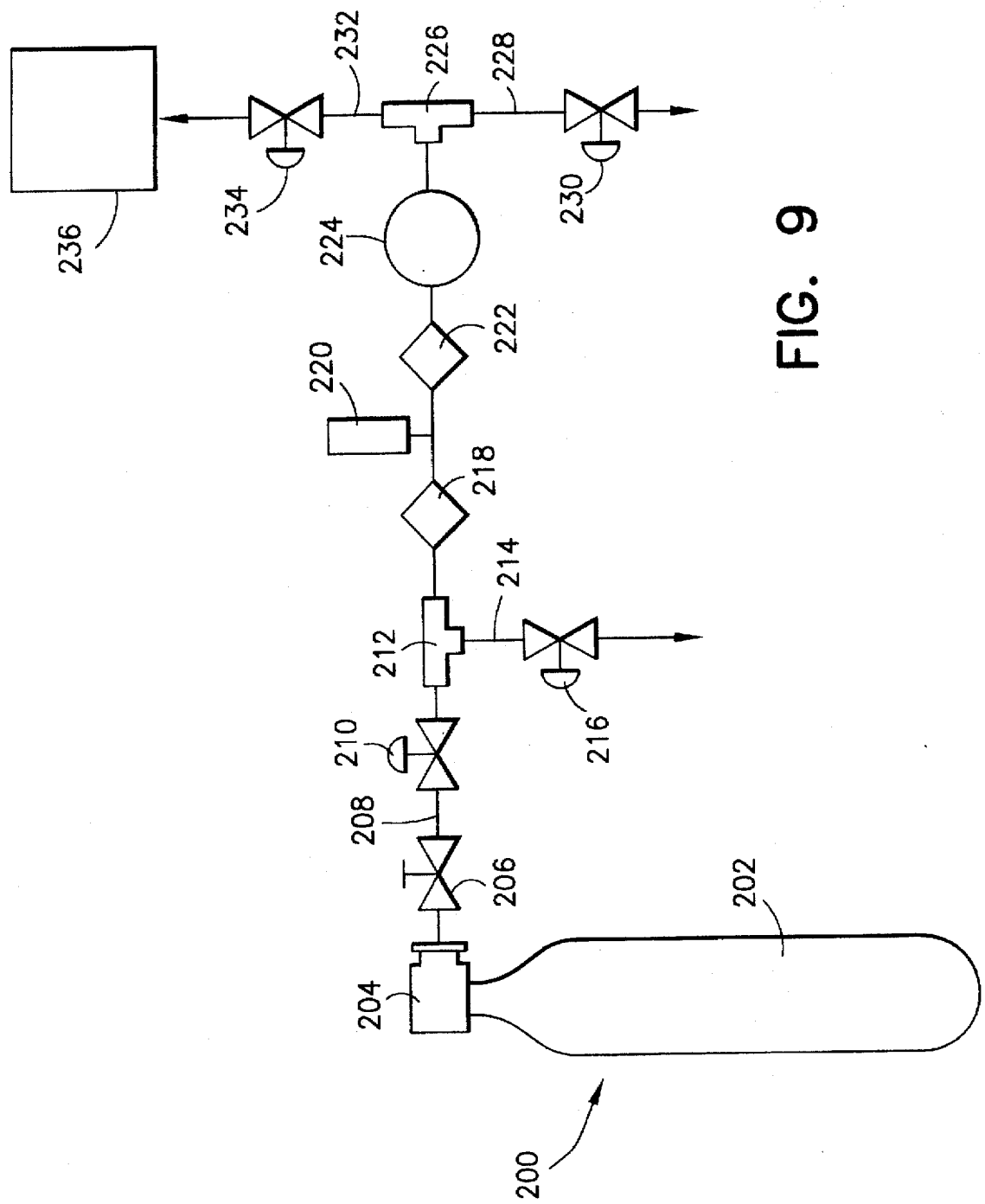
FIG. 9 is a schematic representation of a process system with an integrated gas storage and delivery unit in accordance with the present invention.

FIG. 9 is a schematic representation of a process system according to an illustrative embodiment of the present invention, in which the storage and delivery unit is integrated with a gas-utilizing process unit, and with the sorbate gas being extracted from the storage and dispensing vessel by means of a motive fluid driver, and flowed to the gas utilizing process unit.

As shown in FIG. 9, the process system comprises a gas storage and dispensing unit 200 including a cylinder 202 having an interior volume which may for example be from about 0.4 liter to about 4.0 liters, and filled with a bed of suitable physical adsorbent material, e.g., a zeolite sorbent, activated bead carbon, or other suitable physical adsorbent medium. The physical adsorbent in the cylinder 202 has adsorbed thereon a gas which may be a single component or multi-component gas.

The cylinder 202 may be provided as shown with a cylinder head 204 which may in turn be provided with a cylinder head valve or coupleable to a suitable dispensing valve as shown.

The cylinder 202 illustrated in FIG. 9 is connected to a manifold 208, having disposed therein a valve 206 for controllably releasing gas from cylinder 202, upstream of a gas cylinder isolation valve 210, which may be selectively actuated to close cylinder 202 to communication with the manifold 208.

The manifold has a branch fitting 212 therein, by means of which the manifold 208 is coupled in gas flow communication with a branch purge line 214 having inert gas purge isolation valve 216 therein, whereby the manifold may be purged with inert gas, prior to active operation delivery of gas from cylinder 202.

Downstream from the fitting 212, the manifold contains two successive gas filters 218 and 222, intermediate of which is disposed a pressure transducer 220 which may, for example, have a pressure operating range of from about 0 to about 25 psia.

A motive fluid driver 224 is coupled with the manifold 208 and is employed in operation to extract the sorbate gas from the cylinder 202, providing a pressure condition exterior of the cylinder 202 effecting desorption of the sorbed gas from the sorbent material in the cylinder as well as withdrawal of interstitial gas in the void spaces of the adsorbent bed and gas in the head space of the cylinder. The motive fluid driver may comprise a pump or other sorbate gas extractor means, as previously described. A vacuum pump may be usefully employed in some instances to ensure desorption of substantially all of the sorbed gas from the sorbent medium in the cylinder, thereby achieving high efficiency utilization of the gas source storage and dispensing unit.

The manifold 208 is connected downstream of motive fluid driver with a branch fitting 226 to which is coupled a bypass conduit 228 having bypass isolation valve 230 therein. The manifold downstream of fitting 226 has a gas flow on-off valve 234 in line 232, and line 232 may also contain other flow control means therein (not shown) for controllably adjusting the flow rate of the gas flowed in line 232 to the gas-utilizing process unit 236.

The gas-utilizing process unit 236 may be any of a wide variety of processing components or units in which the gas furnished from the gas storage and dispensing apparatus and flowed through the manifold is used. Such use of the dispensed gas may comprise consumption of the gas, e.g., as a reactant or co-reactant in the process unit. Alternatively, the dispensed gas may be used as a treatment gas which is not compositionally changed, or the gas may be decomposed, phase-changed, used as an adjuvant, carrier or other ingredient in the process unit, or otherwise advantageously be employed in the process which is carried out in such process unit. The process unit may for example be an ion implant process unit or other process unit for the manufacture, treatment or processing of semiconductor materials.

Although the invention has been described herein with reference to specific aspects, embodiments, and features, it will be recognized that the invention is susceptible of being subject to various modifications, variations, and embodiments, and therefore all such modifications, variations, and other embodiments are to be appreciated, as being within the spirit and scope of the invention as claimed.

What is claimed is:

1. A process for storage and dispensing of a gas sorbable on a solid-phase physical sorbent medium, said process comprising:

providing a storage and dispensing vessel holding a solid-phase physical sorbent medium;

adsorbing said gas on said solid-phase physical sorbent medium to yield said gas adsorbed on said solid-phase physical sorbent medium, at an interior pressure not exceeding about one atmosphere in said storage and dispensing vessel;

establishing, exteriorly of said storage and dispensing vessel, a pressure below said interior pressure, to effect desorption of at least a portion of said gas from the solid-phase physical sorbent medium as desorbed gas, and flowing said desorbed gas out of the storage and dispensing vessel; and pumping the desorbed gas from the storage and dispensing vessel to a predetermined pressure, wherein said predetermined pressure is higher than the pressure of the desorbed gas flowed out of the storage and dispensing vessel.

2. A process according to claim 1, wherein said pumped desorbed gas is pumped to a desorbed gas utilization zone.

3. A process according to claim 1, wherein the solid-phase physical sorbent medium comprises a material selected from the group consisting of silica, carbon molecular sieves, alumina, macroreticulate polymers, kieselguhr, carbon, and aluminosilicates.

4. A process according to claim 1, wherein the solid-phase physical sorbent medium comprises a crystalline aluminosilicate composition.

5. A process according to claim 4, wherein the crystalline aluminosilicate composition has pore size in the range of from about 4 to about 13 Angstroms.

6. A process according to claim 4, wherein the crystalline aluminosilicate composition comprises 5A molecular sieve.

7. A process according to claim 1, wherein the solid-phase physical sorbent medium comprises an activated bead carbon material.

8. A process according to claim 1, wherein the solid-phase physical sorbent medium is present in said storage and dispensing vessel with a chemisorbent material having a sorptive affinity for contaminants of said sorbate gas therein.

9. A process according to claim 8, wherein the chemisorbent material has a sorptive affinity for non-inert atmospheric gas contaminants of said sorbate gas therein.

10. A process according to claim 8, wherein the chemisorbent material comprises a scavenger selected from the group consisting of:

(A) a scavenger including a support having associated therewith, but not covalently bonded thereto, a compound which in the presence of said contaminant provides an anion which is reactive to effect the removal of said contaminant, said compound being selected from one or more members of the group consisting of:
       (i) carbanion source compounds whose corresponding protonated carbanion compounds have a $pK_a$ value of from about 22 to about 36; and
       (ii) anion source compounds formed by reaction of said carbanion source compounds with the sorbate gas; and (B) a scavenger comprising:
       (i) an inert support having a surface area in the range of from about 50 to about 1000 square meters per gram, and thermally stable up to at least about 250° C.; and
       (ii) an active scavenging species, present on the support at a concentration of from about 0.01 to about 1.0 moles per liter of support, and formed by the deposition on the support of a Group IA metal selected from sodium, potassium, rubidium, anal cesium and their mixtures and alloys and pyrolysis thereof on said support.

11. A process according to claim 1, wherein the sorbate gas comprises an undesired impurity component, and the solid-phase physical sorbent medium is provided in the storage and dispensing vessel together with an impurity scavenger for removal of the impurity component from the sorbate gas.

12. A process system, comprising:

an adsorption-desorption apparatus, for storage and dispensing of a gas, said apparatus comprising:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure not exceeding about one atmosphere;

a sorbate gas physically adsorbed on said solid-phase physical sorbent medium;

a dispensing assembly coupled in gas flow communication with the storage and dispensing vessel, comprising a motive fluid driver constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly; and a gas utilization unit coupled in gas flow-receiving relationship to the dispensing assembly, for utilization of dispensed gas in said unit.

13. A process system according to claim 12, wherein said storage and dispensing vessel has an interior volume, containing said physical sorbent medium, in the range of from about 0.25 liters to about 40 liters, such that the storage and dispensing vessel is manually transportable in character.

14. A process system according to claim 12, wherein the motive fluid driver comprises a device selected from the group consisting of pumps, blowers, fans, turbines, compressors, venturis, eductors, pressure-building circuits, bellows, diaphragms, peristaltic roller circuits, thermally-coupled gas expansion drivers, and vacuum extractors.

15. A process system according to claim 12, wherein said gas utilization unit is selected from the group consisting of ion implant units, gas/liquid contacting units, material doping units, gas sterilization and decontamination units, gas injection decomposition-suppression units, fire and explosion-suppression units, laser units, engines, fuel cells, fluidized beds, gas reaction units, solid/gas reaction units, material surface passivation units, semiconductor manufacturing plants, etching units, oxide formation units, epitaxial growth units, metallization units, planarization units, and chemical vapor deposition reactors.

16. A process system according to claim 12, further comprising a heater operatively arranged in relation to the storage and dispensing vessel for selective heating of the solid-phase physical sorbent medium, to effect thermally-enhanced desorption of the sorbate gas from the solid-phase physical sorbent medium during at least part of the dispensing of said sorbate gas.

17. A process system according to claim 12, wherein the solid-phase physical sorbent medium comprises a material selected from the group consisting of silica, carbon molecular sieves, alumina, macroreticulate polymers, kieselguhr, carbon, and aluminosilicates.

18. A process system according to claim 12, wherein the solid-phase physical sorbent medium comprises a crystalline aluminosilicate composition.

19. A process system according to claim 18, wherein the crystalline aluminosilicate composition has pore size in the range of from about 4 to about 13 Angstroms.

20. A process system according to claim 18, wherein the crystalline aluminosilicate composition comprises 5A molecular sieve.

21. A process system according to claim 12, wherein the solid-phase physical sorbent medium comprises an activated bead carbon material.

22. A process system according to claim 12, wherein the solid-phase physical sorbent medium is present in said storage and dispensing vessel with a chemisorbent material having a sorptive affinity for contaminants of said sorbate gas therein.

23. A process system according to claim 11, wherein the chemisorbent material has a sorptive affinity for non-inert atmospheric gas contaminants of said sorbate gas therein.

24. A process system according to claim 22, wherein the chemisorbent material comprises a scavenger selected from the group consisting of:

(A) a scavenger including a support having associated therewith, but not covalently bonded thereto, a compound which in the presence of said contaminant provides an anion which is reactive to effect the removal of said contaminant, said compound being selected from one or more members of the group consisting of:
  (i) carbanion source compounds whose corresponding protonated carbanion compounds have a $pK_a$ value of from about 22 to about 36; and
  (ii) anion source compounds formed by reaction of said carbanion source compounds with the sorbate gas; and (B) a scavenger comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

25. An adsorption-desorption apparatus, for storage and on-demand dispensing of a gas sorbable on a solid-phase physical sorbent medium, said apparatus comprising:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure not exceeding about one atmosphere;

a sorbate gas physically adsorbed on said solid-phase physical sorbent medium;

a dispensing assembly coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly; and a selectively actuatable pump coupled to said dispensing assembly for extracting the sorbate gas from the solid-phase physical sorbent medium in the storage and dispensing vessel via desorption of the sorbate gas from the solid-phase physical sorbent medium, pressurizing the desorbed gas and discharging the resultingly pressurized gas.

* * * * *

UNITED STATES PATENT AND TRADEMARK OFFICE
CERTIFICATE OF CORRECTION

PATENT NO. : 5,707,424
DATED : January 13, 1998
INVENTOR(S) : Tom et al.

It is certified that error appears in the above-identified patent and that said Letters Patent is hereby corrected as shown below:

On the title page,

| | |
|---|---|
| Item [63] | "Ser. No. 690,633" should be --650,633--. |
| Column 10, line 37 | "temperayure" should be -- temperature --. |
| Column 12, line 33 | "10parts" should be -- 10 parts--. |
| Column 18, line 29 | "anal" should be -- and --. |

Signed and Sealed this

Fifteenth Day of September, 1998

Attest:

BRUCE LEHMAN

Attesting Officer        Commissioner of Patents and Trademarks